United States Patent
Loeffler et al.

(10) Patent No.: US 11,423,612 B2
(45) Date of Patent: Aug. 23, 2022

(54) CORRECTING SEGMENTED SURFACES TO ALIGN WITH A RENDERING OF VOLUMETRIC DATA

(71) Applicant: Arivis AG, Munich (DE)

(72) Inventors: Falko Loeffler, Graal-Mueritz (DE); Thomas Ruth, Rostock (DE); Christian Goetze, Rostock (DE); Michael C Wussow, Madison, WI (US)

(73) Assignee: Arivis AG, Munich (DE)

( * ) Notice: Subject to any disclaimer, the term of this patent is extended or adjusted under 35 U.S.C. 154(b) by 0 days.

(21) Appl. No.: 16/870,938

(22) Filed: May 9, 2020

(65) Prior Publication Data
US 2020/0273244 A1 Aug. 27, 2020

Related U.S. Application Data

(63) Continuation of application No. PCT/EP2018/080835, filed on Nov. 9, 2018.
(Continued)

(51) Int. Cl.
*G06T 15/00* (2011.01)
*G06T 17/10* (2006.01)
(Continued)

(52) U.S. Cl.
CPC ............... *G06T 17/10* (2013.01); *G06T 7/11* (2017.01); *G06T 15/08* (2013.01)

(58) Field of Classification Search
CPC ........... G06T 15/08; G06T 19/00; G06T 7/12; G06T 2200/24; G06T 17/10; G06T 7/11
(Continued)

(56) References Cited

U.S. PATENT DOCUMENTS

| 8,081,180 B2* | 12/2011 | Storti | B33Y 50/00 345/420 |
| 8,660,353 B2* | 2/2014 | Storti | G06T 7/60 382/173 |

(Continued)

FOREIGN PATENT DOCUMENTS

WO 2009015122 A1 1/2009

OTHER PUBLICATIONS

Jones, M.W., Baerentzen, J.A. and Sramek, M., 2006. 3D distance fields: A survey of techniques and applications. IEEE Transactions on visualization and Computer Graphics, 12(4), pp. 581-599.*

(Continued)

*Primary Examiner* — Phu K Nguyen
(74) *Attorney, Agent, or Firm* — LaBatt, LLC (57) ABSTRACT

The invention relates to a computer-implemented method comprising the steps of: (S100) presenting a surface (S) comprising segments derived from volumetric data (VD) in a virtual reality user interface (6); (S200) presenting volumetric data (VD) in the virtual reality user interface (6); (S300) applying a signed distance field technique (SDF) to the segments in reference to the presented volumetric data (VD); (S400) adjusting at least one of the segments based on a result of applying the signed distance field technique (SDF) so that the presented surface data complies with the presented volumetric data (VD); and (S500) saving the adjusted at least one of the segments in a data file (DF) separately from a data file of the volumetric data (VD).

19 Claims, 3 Drawing Sheets

Related U.S. Application Data (60) Provisional application No. 62/583,839, filed on Nov. 9, 2017, provisional application No. 62/620,758, filed on Jan. 23, 2018.

(51) Int. Cl.
*G06T 7/11* (2017.01)
*G06T 15/08* (2011.01)

(58) Field of Classification Search
USPC .......................................................... 345/418
See application file for complete search history.

(56) References Cited

U.S. PATENT DOCUMENTS

| | | | | |
|---|---|---|---|---|
| 9,886,015 | B2* | 2/2018 | Wilson | B29C 64/393 |
| 10,137,646 | B2* | 11/2018 | Stevens | B29C 64/386 |
| 10,346,504 | B2* | 7/2019 | Van Lierde | G06F 17/10 |
| 10,569,980 | B2* | 2/2020 | Bhide | B65H 7/06 |
| 10,589,509 | B2* | 3/2020 | Carruesco Llorens | B33Y 50/02 |
| 2008/0117205 | A1 | 5/2008 | Storti et al. | |
| 2017/0015057 | A1 | 1/2017 | Stevens et al. | |

OTHER PUBLICATIONS

Park JJ, Florence P, Straub J, Newcombe R, Lovegrove S. Deepsdf: Learning continuous signed distance functions for shape representation. InProceedings of the IEEE/CVF Conference on Computer Vision and Pattern Recognition 2019 (pp. 165-174).*

Sanchez M, Fryazinov O, Fayolle PA, Pasko A. Convolution filtering of continuous signed distance fields for polygonal meshes. In Computer Graphics Forum Sep. 2015 (vol. 34, No. 6, pp. 277-288).*

Reipschläger P, Dachselt R. Designar: Immersive 3d-modeling combining augmented reality with interactive displays. InProceedings of the 2019 ACM International Conference on Interactive Surfaces and Spaces Nov. 10, 2019 (pp. 29-41).*

Tang Y, Feng J. Multi-scale surface reconstruction based on a curvature-adaptive signed distance field. Computers & Graphics. Jul. 2017; DOI: 10.1016/j.cag.2017.07.015.*

International Search Report dated Jan. 2, 2019 of international application PCT/EP2018/080835 on which this application is based.
Jones M W et al: 3D distance fields: a survey of techniques and applications, IEEE Transactions on Visualization and Computer Graphics, IEEE Service Center, Los Alamitos, CA, US, vol. 12, No. 4, pp. 581-599, XP002495660, ISSN: 1077-2626, DOI: 10.1109/TVCG.2006.56, Jul. 1, 2006.

* cited by examiner

CORRECTING SEGMENTED SURFACES TO ALIGN WITH A RENDERING OF VOLUMETRIC DATA

CROSS REFERENCE TO RELATED APPLICATIONS

This application is a continuation application of international patent application PCT/EP2018/080835, filed Nov. 9, 2018, designating the United States and claiming priority to U.S. Provisional patent application 62/583,839, filed Nov. 9, 2017 and U.S. Provisional patent application 62/620,758, filed Jan. 23, 2018, and the entire content of these applications is incorporated herein by reference.

TECHNICAL FIELD

This application references methods and systems of direct volume rendering and the like.

This application generally relates to correction of segmented surface data derived from volumetric data of an object. Particularly, the methods and systems claimed herein relate to facilitated correction of segmented surface data to original volume data in virtual and augmented reality imaging.

BACKGROUND

Current techniques for working with segmented surface representations of volumetric data facilitate viewing and general, independent manipulation of the segmented data without referencing the original volume data.

SUMMARY

In embodiments, segmented surfaces, such as those generated from volumetric data may be manipulated, such as in a virtual reality environment, optionally using signed distance field techniques, so that the segmented surfaces are adjusted to comply with a rendering of volumetric data in the virtual reality environment. In embodiments, the segmented surface may be manually and/or automatically generated from the volumetric data. In embodiments, the segmented surface may be automatically and/or manually generated independent of the rendered volumetric data. In embodiments, the segmented surfaces may be manipulated in the virtual reality environment by a tool that facilitates referencing the rendered surfaces to rendered volumetric data, wherein the tool may use signed distance techniques to facilitate referencing the surfaces to the volume. In embodiments, the methods and systems described herein may facilitate producing a segmented surface representation of a volume an order of magnitude or faster than present two-dimensional or the like methods for generating a surface.

BRIEF DESCRIPTION OF THE DRAWINGS

The invention will now be described with reference to the drawings wherein.

DESCRIPTION OF EXEMPLARY EMBODIMENTS

Images, such as 3D volume rendered images, can be difficult to be accurately segmented because of a host of reasons: a) poor signal to noise ratio, b) staining that does not fill objects completely or uniformly, c) varied intensity of signal between the "same" objects, d) objects that appear to touch one another and need to be separated because of packing and/or lack of spatial resolution, and the like. The methods and systems of segmented surface correction to an original volume data that are described in embodiments, herein attempt to solve these and other problems for accurately segmenting images. In embodiments, the methods and systems described herein may be performed manually in a virtual reality-like environment, with limited computer automation of some functions (e.g., segment generation, alignment to volume data, and the like), and with fully automated functions, such as segmentation of the original volume data, and the like.

In embodiments, the methods and systems described herein may facilitate segment proofreading, identifying locations where over and under segmentation has occurred and the like at least due to facilitating determination of relationships between original and segmented data. This may facilitate preserving the correct portions of the original segmentation by, for example manual viewing of the segmented and original data in an electronic display, such as a virtual reality-like display. In embodiments, visibility, transparency, clipping tools and the like may facilitate distinguishing segmented and original volume data.

Tools that may be accessible in the embodiments, described herein to facilitate correcting portions of the segmented image may include sculpting and painting tools that are adapted to facilitate interactively working with segments (e.g., manually or automatically generated) by performing functions such as growing, shrinking, stretching, reconfiguring, amending, splitting, joining, deleting, smoothing, and the like to result in a near-100% fit to the original volumetric data VD.

In embodiments, de-novo segmentation of original volumetric data VD can be performed at least semi-automatically by identifying (e.g., pointing to in a virtual reality like environment) a local region-of-interest and activating an automatic segmentation algorithm, thus rapidly segmenting objects in the region-of-interest. In embodiments, segmentation can be performed by sculpting a generic object to fit the original data or by manually painting from scratch.

In embodiments, applications include, without limitation: import, edit and proofread manually or automatically segmented data against original image volumetric data VD; de-novo segment data automatically, semi-automatically, and/or manually; export segments & statistics (e.g., position, intensity, size, classification) for further analysis, and the like.

In embodiments, a user interface 6 for interactively correcting segmented surface data to substantially align with original volume data may also facilitate seamless exchange in the user interface 6 of original image rendering, segments (as initially prepared and/or as modified through the methods and systems described herein), statistics associated with the volume data, such as image analysis statistics, and the like.

In embodiments, methods and systems may include a method of fitting segmented surface data, such as automatically generated segmented surface data to volumetric data VD that the segmented surface data represents. The methods and systems for fitting segmented surface data may be performed in a virtual and/or augmented reality type environment. In embodiments, fitting may include adjusting a dimensional aspect of one or more segments of the segmented surface data. Adjusting a dimensional aspect may further include aligning a portion of the segmented surface data to a surface S of volumetric data VD that is rendered in a virtual reality environment. In embodiments, aligning may include expanding or shrinking the portion so that it substantially aligns with a visual surface S of the rendered volumetric data VD in the virtual reality environment.

In embodiments, manipulating segmented surface data rendered in a virtual reality environment in spatial coordination with volumetric data VD from which the surface data is generated may include use of a signed distance field technique SDF to facilitate adjusting the surface data to align with the volumetric data VD rendered in the virtual reality environment. In embodiments, the signed distance field technique SDF may indicate a direction of manipulation that may result in the surface data complying with the volumetric data VD, wherein the direction may be a function of a polarity (e.g., positive or negative) of the distance. In embodiments, a positive/negative and/or a negative/positive distance may indicate that at least one point in the surface S is outside/within a target point on the volumetric data VD rendered image. In embodiments, a signed distance value may represent a portion of a surface generation error resulting from manual and/or automated generation of a surface S, such as a segmented surface S, from volumetric data VD, such as via use of an automated surface generation algorithm executing on a processor 4 and/or via a virtual reality user interface 6 surface generation tool.

In embodiments, the methods and systems of adjusting a surface S depicted in a virtual reality environment to comply with a direct rendering of volumetric data VD in the virtual reality environment may be applied to computer aided design, spatial path planning, geometric modelling, life science imaging, medical imaging, sculpting, level-of detail management, surface offsetting, collision detection, and the like. The method and systems described herein may be applied to complex shapes including, without limitation, artistic forms, organic forms, precision parts, volumes, high order function, fractals, and the like.

In embodiments, the methods and systems of adjusting a surface S to comply with a volume in a virtual reality environment may include direct rendering the volume in a first rendering pass, rendering the surface S in a second rendering pass, and integrating the rendered volume from the first pass with the rendered surface S from the second pass with a surface manipulation tool set in the environment, wherein the surface manipulation toolset may include signed distance techniques, adaptively sampled distance fields, and the like. In embodiments, the first and second rendering passes may be performed sequentially, or independently. In embodiments, the rendered surface S may be spatially aligned with the rendered volume based on an index established when the surface S was derived from the volume. In embodiments, the rendered surface S and rendered volume may be mixed in the virtual reality environment based on depth information associated with at least one of the surface and volume data.

In embodiments, manipulation of the surface S in the virtual reality environment may include converting a surface S to a signed distance field representation, performing adjustments in the virtual reality environment (e.g., by manual manipulation of the surface S) based on the signed distance field data so that the surface S is substantially aligned with a surface S of the volume rendering, updating the surface representation, such as by storing an updated file of the surface data, and the like.

In embodiments, a method of aligning a segmented surface representation of volumetric data VD may include generating the surface S representation from the volumetric data VD, rendering the surface representation and the volumetric data VD in a virtual reality user interface 6 (see FIG. 2), determining portions of the surface S that do not align to the volumetric rendering, applying a signed distance field technique SDF to at least a portion of the surface S that does not align to the volumetric rendering, adjusting the surface S based thereon, and saving the adjusted surface S as a version thereof.

In embodiments, surface rendered segments generated from volumetric data VD may be presented in a virtual reality environment. In embodiments, the surface rendered segments are overlaid on their originating volumetric data VD. In embodiments, the surface rendered segments may be enlarged, shrunk, joined, separated, contoured, bent, shaped, and generally manipulated in three dimensions to correct errors of noncompliance of the surface rendered segments with the originating volumetric data VD, thereby causing the surface rendered segments to substantially match the volumetric data VD. In embodiments, the adjusted surface S rendered segments match the volumetric data VD with up to 100% accuracy.

In embodiments, volumetric data VD may be rendered in a virtual reality environment. In the environment, a surface generation tool of the virtual reality environment may be used to generate surface rendered segments from scratch using the volume data to facilitate generating the surface S to comply with the volumetric data VD with up to 100% compliance accuracy.

The methods and systems described herein may be deployed in part or in whole through a machine, that executes computer software, program codes, and/or instructions on a processor 4. The processor 4 may be part of a server, client, network infrastructure, mobile computing platform, stationary computing platform, or other computing platform. A processor 4 may be any kind of computational or processing device capable of executing program instructions, codes, binary instructions and the like. The processor 4 may be or include a signal processor 4, digital processor 4, embedded processor 4, microprocessor 4 or any variant such as a co-processor 4 (math co-processor 4, graphic co-processor 4, communication co-processor 4 and the like) and the like that may directly or indirectly facilitate execution of program code or program instructions stored thereon. In addition, the processor 4 may enable execution of multiple programs, threads, and codes. The threads may be executed simultaneously to enhance the performance of the processor 4 and to facilitate simultaneous operations of the application. By way of implementation, methods, program codes, program instructions and the like described herein may be implemented in one or more thread. The thread may spawn other threads that may have assigned priorities associated with them; the processor 4 may execute these threads based on priority or any other order based on instructions provided in the program code. The processor 4 may include memory that stores methods, codes, instructions and programs as described herein and elsewhere. The processor 4 may access a storage medium through an interface that may store methods, codes, and instructions as described herein and elsewhere. The storage medium associated with the processor 4 for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor 4 may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine, that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. Central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed indifferent devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or another communications network. The program code may be stored on the storage medium associated with the server and executed by a computing device embedded within the server. The base station may include a computing device and storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that maybe stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments, shown and described in detail, various modifications and improvements thereon will become readily apparent to those skilled in the art. Accordingly, the spirit and scope of the present invention is not to be limited by the foregoing examples, but is to be understood in the broadest sense allowable by law.

Figure 1:
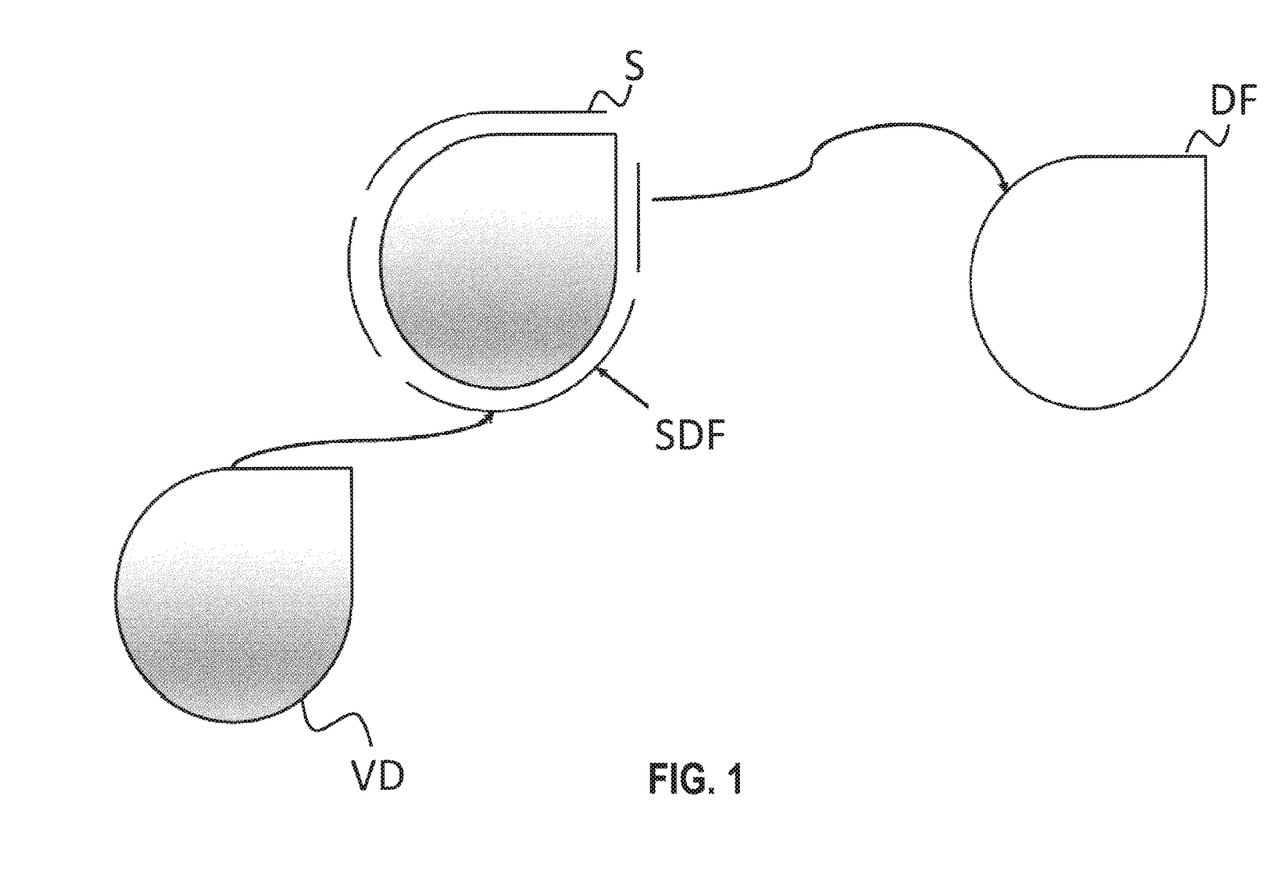
FIG. 1 depicts applying signed distance techniques in a virtual reality environment to adjust a rendered surface to comply with a rendered volume from which the rendered surface originated.
Figure 2:
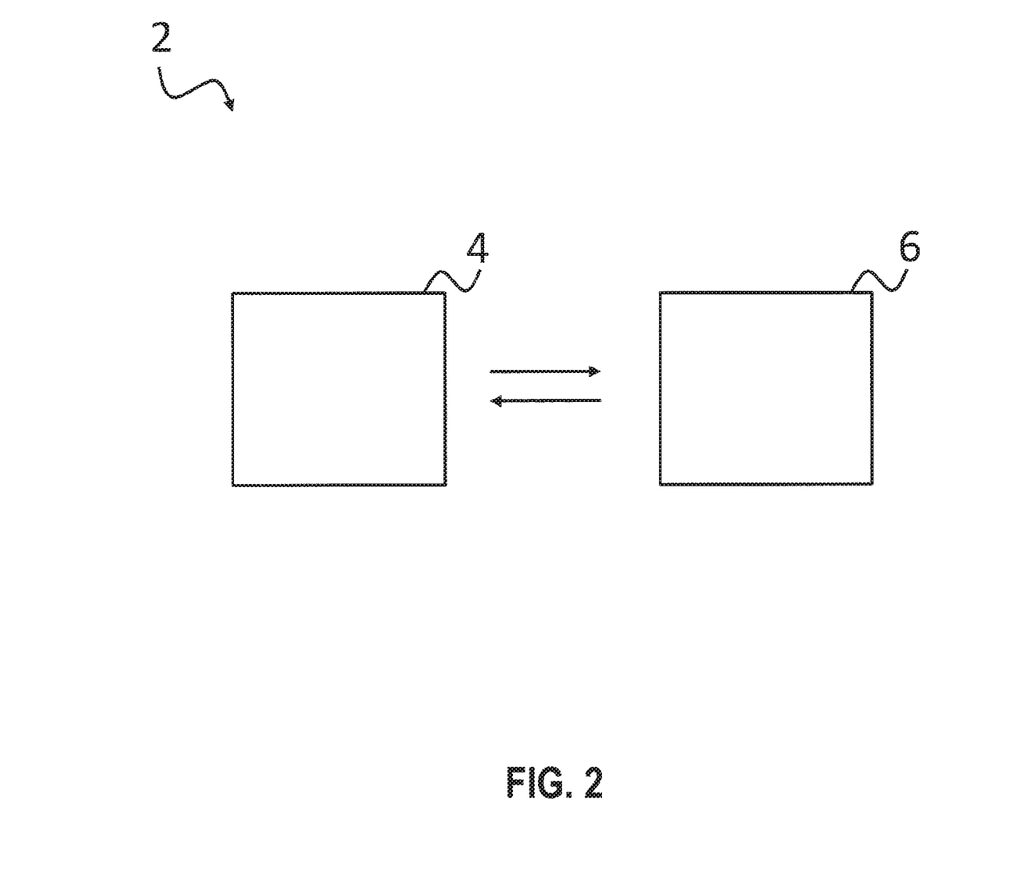
FIG. 2 shows schematically some components of a data processing system.

Additionally, reference is made to FIG. 2.

FIG. 2 shows schematically a data processing system 2 comprising means for carrying out the above described method. The data processing system 2 comprises at least the processor 4 and the user interface 6 with a display as described above.

The data processing system 2 as well as the processor 4 and the user interface 6 comprise hardware-components and/or software-components, e.g., tools, adapted to carry out the above described method.

Figure 3:
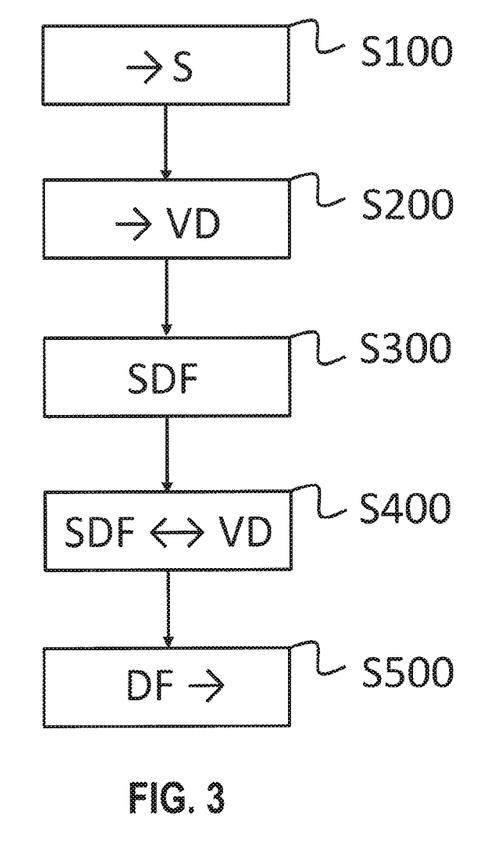
FIG. 3 shows schematically steps of a method for processing volumetric data.

Additionally reference is made to FIG. 3.

FIG. 3 shows schematically steps of a method for processing volumetric data.

In a first step S100 the virtual reality user interface 6 presents a surface S. The surface S comprises segments derived from the volumetric data VD. The surface S can be derived from the volumetric data VD in the virtual reality user interface 6.

The surface S was generated manually and/or automatically from the volumetric data VD. Moreover, the surface S was generated dependently or independently of the rendered volumetric data VD.

The segments surface can be obtained by a de-novo segmentation of the volumetric data VD.

In a further step S200 the virtual reality user interface 6 presents also the volumetric data VD.

In a further step S300 a signed distance field technique SDF is applied to the segments in reference to the presented volumetric data VD.

The signed distance field technique SDF indicates a direction of manipulation that results in surface data complying with the volumetric data VD. A positive/negative and/or a negative/positive distance of the signed distance field technique SDF indicates that at least one point in the surface S is outside/within a target point data in a rendered image based on the volumetric data VD. A signed distance value represents a portion of a surface generation error resulting from manual and/or automated generation of the surface S, in particular a segmented surface, from volumetric data VD.

In a further step S400 at least one of the segments based on a result of applying the signed distance field technique SDF is adjusted so that the presented surface data complies with the presented volumetric data VD.

Adjusting the surface S to comply with the volumetric data VD in a virtual reality environment includes direct rendering of the volumetric date VD in a first rendering pass to obtain a rendering volume, rendering the surface S in a second rendering pass to obtain a rendered surface, and integrating the rendered volume from the first pass with the rendered surface from the second pass with a surface manipulation tool set in the virtual reality environment, wherein the surface manipulation tool includes signed distance techniques. The first and second rendering passes may be performed sequentially or independently. The rendered surface will be spatially aligned with the rendered volume VS based on an index established when the rendered surface was derived from the rendered volume. Further, the rendered surface and rendered volume VR will be mixed in the virtual reality environment based on depth information associated with at least one of the surface data and volume data VD.

In a further step S500 the adjusted at least one of the segments is saved in a data file DF separately from a data file of the volumetric data VD.

Further, the method may comprise a step of fitting the surface S, in particular a automatically generated and segmented surface, to volumetric data VD that the surface S, represents.

Moreover, the method may comprise a step of manipulating the surface S, in particular a segmented surface, rendered in a virtual reality environment in spatial coordination with volumetric data VD from which the surface S is generated include use of a signed distance field technique SDF to adjust the surface S to align with the volumetric data VD rendered in the virtual reality environment. Additionally, the step of a manipulation of the surface S in the virtual reality environment may include converting the surface S to a signed distance field representation, performing adjustments in the virtual reality environment based on the signed distance field representation so that the surface S is substantially aligned with a surface of the volume rendering.

The sequence of the steps can also be different from the example described above. For example, the sequence of the steps can be different, or several steps can be executed simultaneously.

The methods and systems described herein facilitate producing a segmented surface representation of a volume an order of magnitude or faster than present two-dimensional or the like methods for generating a surface S.

LIST OF REFERENCE NUMERALS 2 data processing system
4 processor
6 user interface
DF data file
S surface
SDF signed distance field technique
VD volumetric data
S100 step
S200 step
S300 step
S400 step
S500 step

What is claimed is:

1. A computer-implemented method comprising the steps of:
    deriving a surface comprising segments from volumetric data by obtaining a signed distance field referencing said segments to said volumetric data;
    presenting, in a virtual reality user interface, at least a part of said segmented surface overlaid on at least a part of the volumetric data from which the segmented surface originates;
    determining a portion of said surface that does not align to the volumetric data;
    obtaining a signed distance value as a surface generation error for said portion, wherein the signed distance value indicates noncompliance of said segmented surface with the volumetric data from which the segmented surface originates;
    interactively adjusting the signed distance field for at least one of the segments using the signed distance value so that the presented surface aligns more accurately with the presented volumetric data on which the surface is overlaid in the virtual reality user interface; and
    saving the interactively adjusted at least one of the segments in a data file separately from a data file of the volumetric data.

2. The computer-implemented method according to claim 1, wherein the surface is generated manually and/or automatically from the volumetric data.

3. The computer-implemented method according to claim 1, wherein the surface is manipulated by a tool adapted to reference the surface to the presented volumetric data, wherein the tool uses a signed distance field technique to reference the surface to the presented volumetric data.

4. The computer-implemented method according to claim 1, wherein a de-novo segmentation of original volumetric data is performed at least semi-automatically in order to obtain the presented volumetric data.

5. The computer-implemented method according to claim 1, wherein the method includes a method of fitting the surface to the volumetric data.

6. The computer-implemented method according to claim 1, wherein the adjusting of the signed distance field for the at least one of the segments includes use of a signed distance field technique to manipulate the surface to align with the volumetric data rendered in the virtual reality user interface, wherein the surface is in spatial coordination with the volumetric data.

7. The computer-implemented method according to claim 6, wherein the signed distance field technique indicates a direction of manipulation that results in the presented surface complying with the presented volumetric data.

8. The computer-implemented method according to claim 6, wherein a positive/negative or a negative/positive distance of the signed distance field technique indicates that at least one point in the surface is outside/within a target area in a rendered image based on the volumetric data.

9. The computer-implemented method according to claim 6, wherein the signed distance field technique uses the signed distance value.

10. The computer-implemented method according to claim 1, wherein the adjusting of the surface to comply with the volumetric data includes direct rendering of the volumetric data in a first rendering pass to obtain a rendering volume, rendering the surface in a second rendering pass to obtain a rendered surface, and integrating the rendered volume from the first pass with the rendered surface from the second pass with a surface manipulation tool, wherein the surface manipulation tool includes a signed distance field technique.

11. The computer-implemented method according to claim 10, wherein the first and second rendering passes are performed sequentially and/or independently.

12. The computer-implemented method according to claim 10, wherein the rendered surface is spatially aligned with the rendered volume based on an index established when the rendered surface was derived from the rendered volume.

13. The computer-implemented method according to claim 10, wherein the rendered surface and the rendered volume are mixed in the virtual reality user interface based on depth information associated with at least one of the data of the surface and the volumetric data.

14. The computer-implemented method according to claim 1, wherein the adjusting of the signed distance field for the at least one segment of the surface includes converting the surface to a signed distance field representation, performing adjustments based on the signed distance field representation so that the surface is substantially aligned with a surface of the volumetric data.

15. The computer-implemented method according to claim 1, wherein the method comprises generating the surface from the volumetric data, rendering the surface and the volumetric data, determining portions of the surface that do not align to the volumetric data, applying a signed distance field technique to at least a portion of the surface that does not align to the volumetric data, adjusting the surface based thereon, and saving the adjusted surface.

16. A data processing system comprising means for carrying out the steps of the method according to claim 1.

17. A computer program stored on a non-transitory computer-readable medium, the computer program comprising instructions which, when the program is executed by a processor, cause the processor to carry out the steps of the method according to claim 1.

18. A non-transitory computer-readable medium comprising instructions which, when executed by a processor, cause the processor to carry out the steps of the method according to claim 1.

19. The computer-implemented method according to claim 1, further comprising manipulating the determined portion in three dimensions by at least one of enlarging, shrinking, joining, separating, contouring, bending or shaping, at least one of said surface segments.

* * * * *